Figure 1:
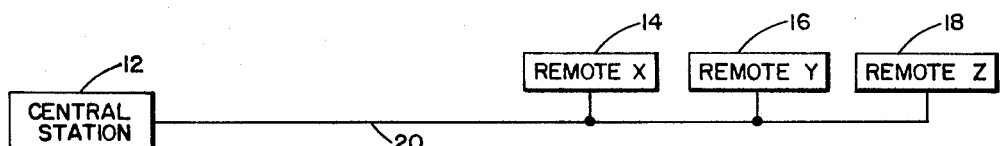

July 23, 1968            D. F. DAY            3,394,349
SUPERVISORY CONTROL SYSTEM HAVING REPEAT MESSAGE CONTROL
AND COUNT CONTROL OF THE NUMBER OF REPEAT MESSAGES
Filed March 22, 1965            3 Sheets-Sheet 1

INVENTOR.
Donald F. Day

BY
ATTYS.

July 23, 1968　　　　　D. F. DAY　　　　　3,394,349
SUPERVISORY CONTROL SYSTEM HAVING REPEAT MESSAGE CONTROL
AND COUNT CONTROL OF THE NUMBER OF REPEAT MESSAGES
Filed March 22, 1965　　　　　　　　　　　　　　3 Sheets-Sheet 3

INVENTOR.
Donald F. Day

BY
*Mueller, Aichele & Raumer*

ATT'YS.

United States Patent Office 3,394,349
Patented July 23, 1968

3,394,349
**SUPERVISORY CONTROL SYSTEM HAVING RE-
PEAT MESSAGE CONTROL AND COUNT CON-
TROL OF THE NUMBER OF REPEAT MESSAGES**
Donald F. Day, Scottsdale, Ariz., assignor to Motorola,
Inc., Franklin Park, Ill., a corporation of Illinois
Filed Mar. 22, 1965, Ser. No. 441,549
5 Claims. (Cl. 340—163)

This invention relates to a supervisory control system and in particular to such a system in which transmission errors are eliminated.

A supervisory control system may be operated in a quiescent mode in which information is transmitted from a remote station to a central station only when some change has occurred at the remote station. In normal operation, the changes occurring at the remote station which are of immediate interest to the central station are those involving the status of particular devices at the remote station and this is the only information which would be transmitted in the quiescent mode. The supervisory control system may also be operated in a programmed mode at the same time that it is operated in a quiescent mode. In a programmed mode commands are sent as desired to the remote station from the central station to operate devices and to obtain data from the remote station. However programmed transmissions are not relied on as a primary mode of acquisition of change of state information of the remote devices since it is important to obtain change of state information immediately.

In a system operating in the quiescent mode, a signal may be transmitted to the central station from the remote station to indicate that a switch is off or on or that a valve has opened or closed. Each time the state of one of the devices monitored by the system changes, a signal is transmitted from the remote station, where the device is located, to the central station. The signal may cause a display for that device to be changed to indicate the new state of the device and in some cases the change may be recorded permanently by means of printer, a tape punch or some other recording mechanism. Usually more than one device is monitored at a given remote station and it is possible for the remote station to transmit a message which contains information on the state of all the devices monitored, each time the state of any particular device changes.

In this type of system the message transmitted from the remote station to the central station may not be received properly by the central station or it may not be received at all. If the message is not received correctly or not received at all, the information contained therein will be lost and the status of the remote device indicated at the central station will not be correct. The loss may be caused by noise, fading, faulty decoding or simultaneous transmission from more than one station. Since the remote stations are part of the same system it would not be unusual for a change of state to take place simultaneously at each of two stations. In this case, each station will transmit to the central station at the same time causing a garbled message to be received at the central station. In supervisory control systems for electric power systems information is often carried on the power transmission lines. Faults on the line which would cause operation of monitored devices could also generate interference on the transmission line blocking the messages from the remote station to the central station.

In order to assure the eventual correct reception of messages at the central control stations, some form of traffic control is necessary. Prior systems have provided traffic control to guard against the loss of a message when two or more remote stations transmit simultaneously. However, these systems depend upon the central station recognizing a garbled transmission and informing the remote station by sending a message to the remote stations. These systems do not provide protection against the loss of a message caused by noise in the transmission channel or the complete loss of communication between the remote station and the central station.

It is therefore an object of this invention to provide a supervisory control system operating in a quiescent mode and which has an improved message traffic control system.

Another object of this invention is to provide a supervisory control system operating in a quiescent mode in which garbled or incorrect messages received by the central station are repeated by the remote station until the correct message is received.

Another object of this invention is to provide a supervisory control system operating in a quiescent mode in which messages transmitted by the remote station and not received by the central station are repeated by the remote station.

A feature of this invention is the provision of a supervisory control system operating in a quiescent mode in which the central station includes message security means and acknowledge encoder means for developing an acknowledge signal upon the receipt of a valid message.

Another feature of this invention is the provision of a supervisory control system operating in a quiescent mode and including timing means which cause a message initiated by a remote station to be repeated at predetermined intervals until an acknowledge signal is received from the central station.

Another feature of this invention is the provision of a supervisory control system operating in a quiescent mode in which the timing means at each remote station are set for different intervals so that the time intervals between the repeat transmissions from each remote station are different.

Another feature of this invention is the provision of a supervisory control system operating in a quiescent mode in which counter means are provided to count the number of transmissions and which disable the timing means after a predetermined number of transmissions so that the number of repeat transmissions from each remote station can be limited to a predetermined number.

Another feature of this invention is the provision of a supervisory control system operating in a quiescent mode in which a plurality of messages are transmitted during a transmission period and in which counting means are provided to count the number of acknowledge signals received. Upon receipt of a predetermined number of acknowledge signals the counting means develops an output signal to disable the timer means and prevent further transmission.

Figure 5:
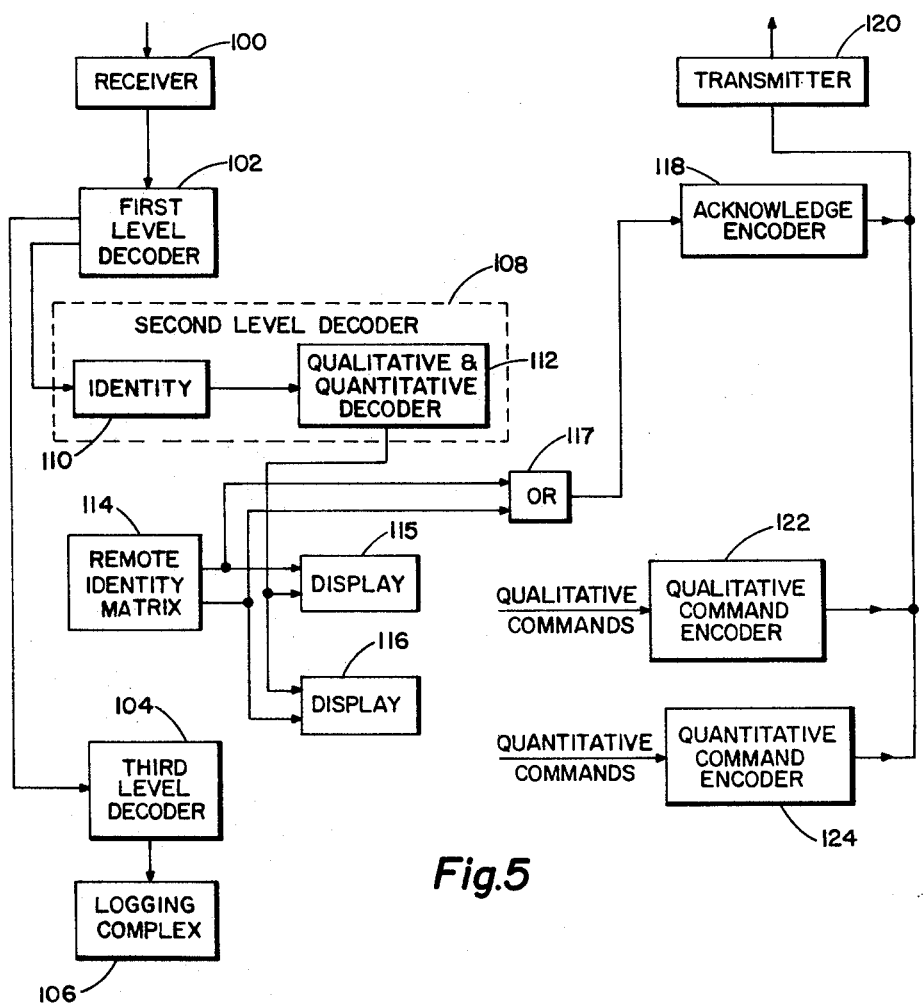
Figure 2:
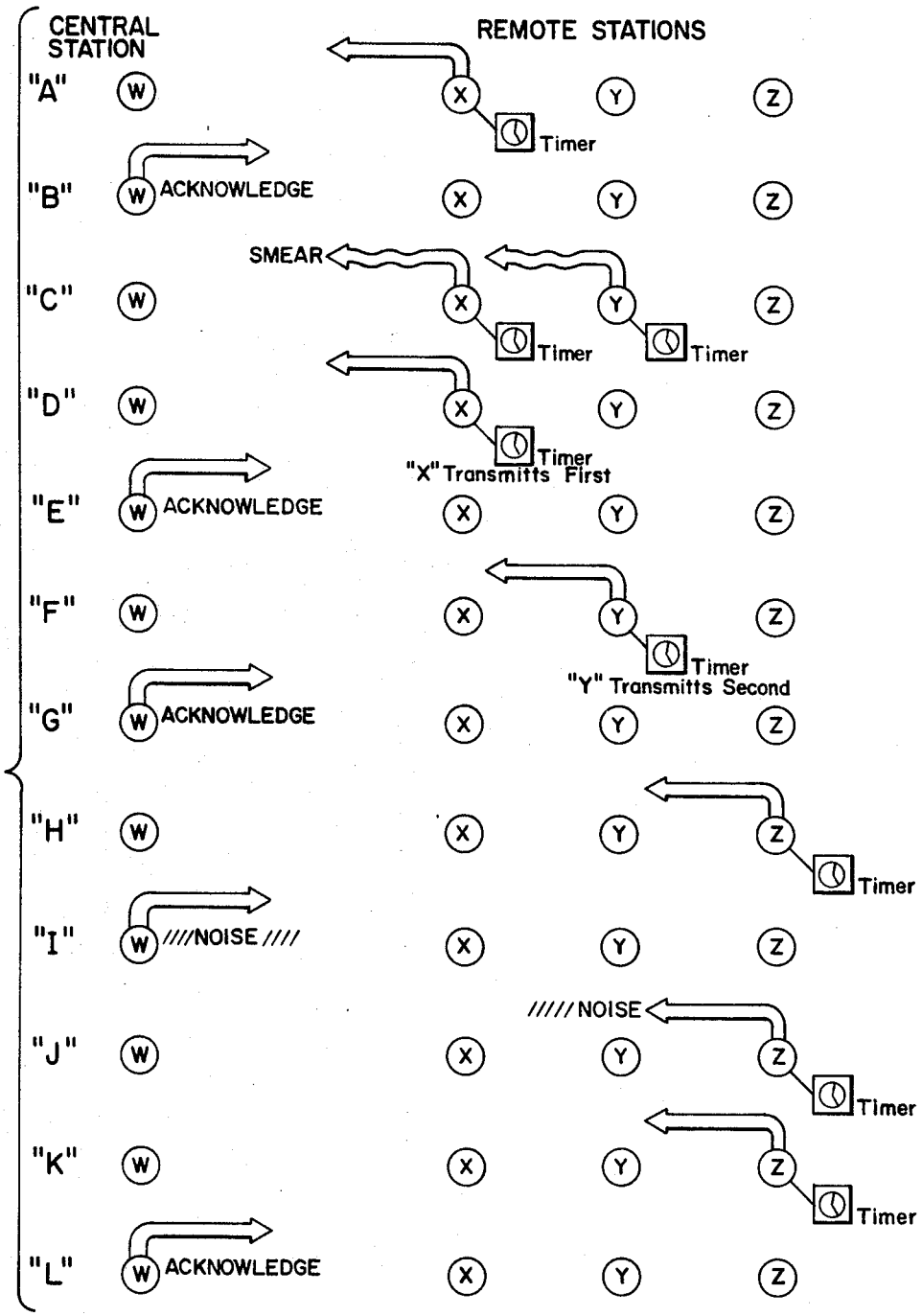
Figures 3, 4:
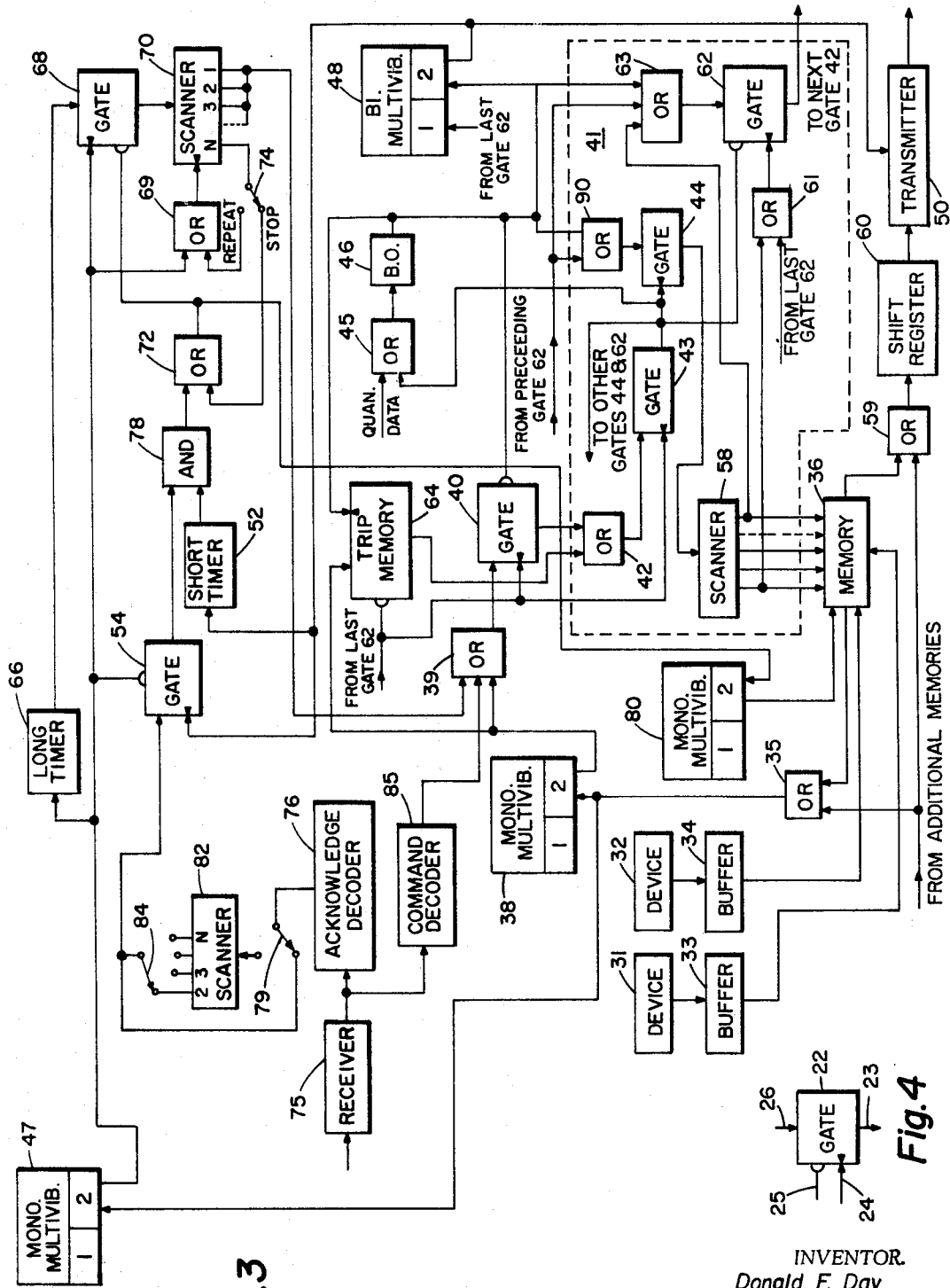

The invention is illustrated in the drawings in which:
FIG. 1 is a block diagram showing the location of the central station and remote stations in the system;
FIG. 2 is a flow diagram illustrating the sequence of operation of the acknowledge feature of the system;
FIG. 3 is a block diagram of the retransmission and acknowledgment system of the remote station;
FIG. 4 illustrates the symbols used in the block diagram of FIG. 3; and
FIG. 5 is a block diagram of the system used at the central station for receiving a message and developing an acknowledge signal.

In practicing this invention a supervisory control system is provided including a central station and a plurality of remote stations, with the remote stations being coupled to the central station by a communication channel. When a change of state occurs at the remote station a message is transmitted to the central station giving the status of the devices at the remote station. This message is repeated at predetermined time intervals until an acknowledge signal is received from a central station indicating that the message has been correctly received. Provision is made for transmitting two or more acknowledge signals if two or more messages have been sent from the same station. Provision is also made for repeating the transmission of the message an definite number of times or a predetermined number of times until an acknowledge signal is received. The time interval between retransmissions at each remote station is different so that if two remote stations transmit initial messages simultaneously the subsequent retransmissions will not occur at the same time and thus they will not cause mutual interference.

In FIG. 1 there is shown a supervisory control system having the features of this invention. A central station 12 is coupled to remote station X, 14, remote station Y, 16, and remote station Z, 18, by means of a communication channel 20. The communications channel may be a wire line, a radio system or other communication link. While three remote stations are shown in this example, the system is not limited to this number.

The operation of the system in acknowledging correct reception of a signal transmitted from the remote station to the central station is illustrated in FIG. 2, lines A through L. Each line shows a central station W and three remote stations X, Y and Z. In line A the remote station X is shown transmitting a change of state message to the central station. At the beginning of transmission a timer at remote station X automatically starts. In line B the central station W transmits a message which acknowledges that the remote to central message was properly received. The receipt of an acknowledge message by remote station X, within a predetermined time period, resets the timer and prevents further transmission from that station. This is the normal operation when there is no loss of message.

In line C, two stations X and Y are shown transmitting simultaneously. The simultaneous tranmissions interfere with each other so that the central station cannot properly receive the data transmitted. As before, when the remote stations transmit they start their timers at the beginning of the transmission. Each of the stations have timers with cycles of different lengths, and in this illustration station X has the shorter timing cycle so it will retransmit first. Since the central station did not receive a valid signal no acknowledgment signal is transmitted to the remote stations. Thus as illustrated in line D, station X, at the end of its timing cycle, retransmits the message. The retranmitted message is properly received at the central station and an acknowledge signal is sent to remote X ending transmission from that remote station as shown in line E. At the end of its timing cycle remote station Y retransmits its message to the central station as shown in line F. The retransmitted message from remote station Y is correctly received by the central station and an acknowledge signal is transmitted as shown in line G. Thus the messages of both remote stations are correctly received by the central station even though they interfered with each other during the first tranmission.

In line H, station Z is shown transmitting to central station. In line I, the central station acknowledges the transmission, but this acknowledgment is not satisfactory since noise or other interference in the communication channel prevents station Z from recognizing the acknowledgment signal. Thus, at the end of the timing cycle station Z, not having received an acknowledge signal, retransmits the data and again starts its timer, as shown in line J. Again noise in the communication channel interferes with the data transmitted to the central station so that the central station does on receive this data thus no acknowledge signal is transmitted to the remote station. As shown in line K, station Z again retransmits the same data information to central station W at the end of a predetermined time period. In line L central station W, having received the information from station Z, transmits an acknowledge signal which stops the transmission from station Z and resets its timer.

In a system of the type shown in FIGS. 1 and 2 qualitative and quantitative information is transmitted between the remote stations and the central stations. For example the central station may command a particular remote station to carry out a certain function, or the central station may request certain data information from the remote station. A change occurring at the remote station may be transmitted to the central station to update the displayed information at the central station. In the example given in this description an acknowledgment is given only for the operation of qualitative remote devices such as valves or switches. However, the system can be extended to cover the transmission of any desired information from the remote station to the central station.

The messages transmitted between the central station and remote station are coded in a binary form. In this example three forms of binary code are used. These codes are: (1) 2/5 code, (2) unitary or discrete bit code, and (3) binary coded decimal. All these codes are handled identically in the transmission and reception phases of the system.

In the 2/5 code used each binary number contains two ones and three zeros. With a five degit binary number ten possible combinations are available. In the unitary or discrete bit code, each bit conveys information about a particular function. This is especially adaptable to functions which have only two states, for example a switch or a valve which is either open or closed. In the binary coded decimal system, each decimal digit of a number is represented by a binary number.

An example of a massage form which is transmitted to the central station from the remote station to indicate the state of devices at the remote station is described below. In this example, a 30 bit unitary number is transmitted with each bit corresponding to a particular device at the remote station. Since each device is of the type which can be in one of two states, a 0 or a 1 is transmitted to indicate the state of the device. In order that the message may be properly checked for security, to assure that a correct message has been received, the message is transmitted in a series of digits, with each digit having five bits. The first two digits of information are transmitted in the two of five code and furnish the information to the central station as to the type of message being received. The first two digits are followed by a hole indicating the end of this portion of the message. Following the hole six digits are transmitted with each digit containing five bits, for a total of 30 bits. These six digits are in a unitary code and comprise the 30 bit number giving the status of the devices at the remote station. Following the six digits of device information, two digits in a two of five code are transmitted to identify the station sending the message. The end of the message is indicated by two holes. The message transmitted would have the following appearance: 2/5 2/5 H U U U U U U 2/5 2/5 H H. The transmission could be made by using a separate frequency for a 0 and a 1 and a third frequency midway between the 0 and 1 frequencies to indicate a hole or the absence of either a 0 or 1.

FIG. 3 is a block diagram of one of the remote stations shown in FIG. 1. FIG. 4 illustrates the symbols used in this application to designate the various inputs and outputs of gates shown in FIG. 3. Input 24 is a set input which conditions the gate to produce an output at line 23 when an input signal is received over line 26. Input 25 resets or disables the gate so that an input received over line 26 will not produce an output.

At each remote station a plurality of devices, shown as 31 and 32 in FIG. 3, can be monitored at the same time. Each remote device is coupled to a buffer, 33 and 34, which is responsive to the condition of the remote device to change a particular bit of a binary number contained in the memory 36. For example, assume 30 devices are located at a remote station. The memory will hold a 30 bit binary number, each separate bit being associated with a particular device. The 30 bit binary number will be divided into six groups, called digits of five bits each. If more than 30 devices are to be monitored at a single remote station, a separate memory is provided for each group of 30 devices. Each memory has associated with it a trip detector 41 for causing the memory to be scanned. The system to be described will be capable of monitoring an unlimited number of memories and thus an unlimited number of remote devices.

When the state of a remote device changes, for example device 32, the bit stored in memory 36 corresponding to device 32 will also change. This produces a change in the 30 bit binary number stored in memory 36. When the binary number stored in memory 36 changes an output pulse is developed which is coupled to monostable multivibrators 38 and 47 through OR gate 35, shifting each of these multivibrators to their second state. After a predetermined period of time multivibrator 38 reverts to its first or stable state producing an output pulse which is coupled to gate 40 through OR gate 39. Gate 40 produces an output pulse which is coupled to gate 43 through OR gate 42. Gates 43 and 40 are normally set at the end of the transmission period. Gate 43 resets or disables itself when it produces an output pulse and must be reset in order to function again.

The output pulse from gate 43 is applied to blocking oscillator 46 through OR gate 45, producing an output pulse which is applied to bistable multivibrator 48 and gate 44 through OR gate 90. Bistable multivibrator 48 is shifted to its second stable state, producing an output pulse which turns on transmitter 50 and arms short duration timer 52. The pulse from bistable multivibrator 48 also sets gate 54.

The output pulse from gate 44 is applied to scanner 58 starting this scanner in operation to transfer the number contained in memory 36 to shift register 60 through OR gate 59. As previously described, the binary number stored in memory 36 has 30 binary bits grouped in six digits. At each step of scanner 58 one digit is transferred in parallel to shift register 60. The five bit digit contained in shift register 60 is then transferred out serially to transmitter 50 for encoding and transmission to the central station. The timing is such that when the five bit digit contained in shift register 60 has been transferred serially to transmitter 50 scanner 58 steps to a second position which transfers another five bit digit to shift register 60. This continues until all of the binary bits in memory 36 have been transmitted to the central station.

During the transfer of the first digit from memory 36, a signal is applied from scanner 58 to gate 62 through OR gate 61 to set gate 62. Gate 62 had previously been reset or disabled by the output pulse from gate 43 so that the pulse from the blocking oscillator 46 applied to gate 62 through OR gate 63 could not produce an output pulse. With gate 62 enabled by the pulse from the first position of scanner 58 any subsequent pulse supplied to gate 62 will produce an output pulse from this gate.

When scanner 58 reaches its last position a pulse is applied to gate 62 through OR gate 63 to produce an output pulse from gate 62. If there is a second memory in the system, the output of gate 62 is coupled to gate 90 of the trip detector associated with the second memory. This causes the second memory to be shifted into shift register 60 through OR gate 59 as previously described. A third memory trip detector would be actuated by a pulse from gate 62 of the second trip detector. This sequence continues until all the memories of the remote station associated with the devices have been read out.

The output of the last gate 62 in the chain is applied to gates 43 and 62 of each trip detector 41 to set gates 43 and 62. The output from the last gate 62 in the chain is also coupled to bistable multivibrator 48 causing this bistable multivibrator to be shifted to its first stable state, and to gate 40 to set this gate, and to trip memory 64 to reset or disable this gate.

When bistable multivibrator 48 reverts to its first stable state transmitter 50 is turned off and timer 52 starts. Short duration timer 52 determines the period during which an acknowledge signal must be received in order to complete the transmission. The output pulse from monostable multivibrator 47, produced when memory 36 actuated multivibrator 47, starts long duration timer 66, disables gate 54, and sets gate 68 and scanner 70 through OR gate 69. Gate 54 is subsequently set by the output pulse from bistable multivibrator 48 when this multivibrator is switched to its second stable state. Thus, if a second change of state occurs while the remote station is waiting for the acknowledge signal from the central station monostable multivibrator 47 will disable gate 54 preventing the acknowledge signal from being recognized by the remote station. This will cause the remote station to retransmit the changes which have occurred so that the central station will receive the correct information. Otherwise, the acknowledge signal for the first change of state will be recognized as an acknowledge signal for both changes of state.

If no acknowledge signal is received, long duration timer 66 produces an output pulse which is coupled to scanner 70 through gate 68. The pulse applied to scanner 70 causes the scanner to step to its first position and produce an output pulse which is coupled to gate 40 through OR gate 39. As previously described the pulse applied to gate 40 initiates the transmission sequence so that the contents of the memories are again transmitted to the central station. This process is repeated until the scanner 70 reaches its last position or an acknowledge signal has been received. If scanner 70 reaches its last position without an acknowledge signal having been received, an output pulse is applied to gate 68 through OR gate 72 causing the OR gate to be disabled. Subsequent pulses from long timer 66 are not coupled to scanner 70 and the system ceases transmission. If it is desired to keep repeating the transmission until an acknowledge signal is received switch 74 can be placed in the repeat position so that the output from the last stage of scanner 70 enables scanner 70 through OR gate 69, causing scanner 70 to repeat the cycle indefinitely.

When a transmission is correctly received by the central station an acknowledge signal is generated which is transmitted to the remote stations. The signals received from the central station are decoded by acknowledge decoder 76 and coupled to gate 54 through switch 79. Gate 54 has previously been set by the output of bistable multivibrator 48 so that the acknowledge signal is applied to AND gate 78. If the acknowledge signal has been received during the time period determined by timer 52, AND gate 78 is enabled and a pulse is applied to gate 68 disabling the gate. This prevents scanner 70 from being stepped by the output from long timer 66 and transmission ceases. The output of OR gate 72 is also coupled to monostable multivibrator 80 causing this multivibrator to shift to its second stable state. The output of monostable multivibrator 80 in its second stable state is coupled to memory 36 resetting the memory. With the memory reset, changes in the state of remote devices can again be received by the memory.

If a change of state takes place during transmission of a message from the remote station to the central station, monostable multivibrator 38 is again shifted to its second state. The output of this multivibrator is coupled to trip memory 64 and stored in this memory. Trip memory 64 has been set or enabled by the output of blocking oscillator 46. The output of this blocking oscillator has also disabled or reset gate 40 so that the output of monostable multivibrator 38 cannot pass through gate 40. When the transmission ends the pulse from the last gate 62 in the sequence is coupled to trip memory 64 disabling the memory. As the memory is disabled any subsequent change of state stored in the memory is coupled to gate 43 through OR gate 42, initiating the transmitting cycle again. Thus, the message is immediately retransmitted giving the most up-to-date condition of the remote devices without waiting for an acknowledgement of the first message. The change of state actuation from a memory also triggers monostable multivibrator 40 which produces an output pulse disabling gate 54 so that any knowledge signals received are disregarded.

If the output of more than one memory is transmitted it is desirable to receive an acknowledgement for each of the transmissions. To accomplish this, switch 79 is switched and the outputs of the acknowledge decoder are coupled to scanner 82. Switch 84 is positioned so that an acknowledge signal will be coupled to gate 54 upon receipt of the desired number of acknowledgments, in this case two. Thus the first acknowledge signal received would merely step the scanner 82 to its second position. The second acknowledge signal received would be coupled through switch 84 to gate 54 where the acknowledgment procedure would be as previously described.

In addition to transmitting automatically when a change of state occurs, the remote station is responsive to a command signal from the central station. Upon receipt of the command signal the remote station transmits a message giving the status of the devices at the remote station. This signal is decoded by command decoder 85, and the output of this command decoder 85 is coupled to gate 40 through OR gate 39 to initiate the transmission cycle.

FIG. 5 is a block diagram of a central station for receiving messages from the remote stations and for transmitting messages to the remote stations. The status of the remote stations is displayed at the central stations and commands to the remote stations may be initiated by an operator located at the central station. In addition to displaying status information, quantitative data may be logged and displayed by the central station.

Messages transmitted to the central station are received by receiver 100 which changes the message to its binary form. The message received may indicate a change of state and be of the form previously described, that is: 2/5 2/5 H U U U U U U 2/5 2/5 H H. This message is coupled to the first level decoder 102 which tests the message for correctness and determines which subsequent decoding level is to receive the message. In the code used in this message the first two 2/5 digits preceding the first hole determine the subsequent decoding level. If the information is quantitative information which is to be logged the message is transferred from first level decoder 102 to third level decoder 104 where it is processed and logged in logging complex 106.

If the information is qualitative or quantitative information which is to be displayed it is coupled to the second level decoder 108. This information is coupled into the second level decoder serially so that the last two digits in the 2/5 code are in the identity module 110 of second level decoder 108, while the message information, in unitary form, is in qualitative and quantitative decoder 112.

Each bit in the message corresponds to particular device at a particular remote station. However, since there are many devices at many remote stations the same digit in the message could refer to one of a large number of similar devices located at separate remote stations. For example, an on-off switch for each remote station may be indicated by the first binary bit. Thus the output of the first bit is coupled to the on-off switch display of each remote unit. The last two digits in the message determine the particular remote station and thus the particular display unit to which the message refers. This information is coupled to remote identity matrix 114 where it is decoded and an output is coupled to the correct display system. The display systems are represented by blocks 115 and 116. Thus only one of the display indications will be actuated by each bit.

There is no output from remote identity matrix 114 until the message has been received correctly and properly identified. Thus all the outputs of the remote identity matrix are also coupled through OR gate 117 to acknowledge encoder 118. When a signal is developed by remote identity matrix 114 it in turn causes an acknowledge signal to be encoded by acknowledge encoder 118. The acknowledge signal is coupled to transmitter 120 for transmission to the remote station. The acknowledge signal thus transmitted indicates to the remote stations that the signal has been correctly received.

Qualitative and quantitative commands can also be transmitted by transmitter 120. These commands originate in modules 122 and 124 respectively and are coupled to the transmitter 120 for transmission to the remote station.

I claim:

1. A supervisory control system having a plurality of remote stations each having message generating means and being adapted to transmit messages randomly to a central station via a communication channel, said control system including in combination, first transmitting means and first receiving means positioned at the central station, second transmitting means and second receiving means positioned at each remote station, first circuit means at each remote station coupling the message generating means to said second transmitting means for causing the generated messages to be transmitted to the central station, timing means at each remote station coupled to said second transmitting means and said first circuit means thereat, each of said timing means being responsive to said message transmission by said second transmitting means to be actuated thereby for a predetermined time period and to generate a first control signal at the end of said time period, said first circuit means being responsive to said first control signal to cause said second transmission means to retransmit the message, said timing means at each remote station having a different time period than said timing means at the other remote stations, whereby said retransmission occurs at different times for each of the remote stations, said first receiving means being responsive to the transmitted message to develop a verification signal upon the receipt of a correct transmitted message from a remote station, means coupling said first receiving means to said first transmitting means and being responsive to said verification signal to cause said first transmitting means to transmit an acknowledge signal, said second receiver means being responsive to said acknowledge signal to develop a second control signal, second circuit means at each remote station coupling said second receiving means to said timing means thereat for applying said second control signal thereto and operating to prevent said timing means from generating said first control signal so that transmission of said message ceases.

2. A supervisory control system having a plurality of remote stations each having message generating means and being adapted to transmit messages randomly to a central station via a communication channel, the central station being responsive to the receipt of a correct message to transmit an acknowledge signal to the remote stations, the control system including in combination, transmitting means and receiving means positioned at each remote station, first circuit means at each remote station coupling the message generating means to said transmitting means thereat for causing the generated messages to be transmitted to the central station, timing means at each remote station coupled to said transmitting means and said first circuit means, each of said timing means being responsive to said message transmission by said transmitting means to be actuated thereby for a predetermined time period and to generate a first control signal at the end of said time period, said first circuit means being responsive to said first control signal to cause said transmission means to retransmit the message, said timing means at each remote station having a different time period than said timing means at the other remote stations, whereby said retransmission occurs at different times for each of the remote stations, said receiver means being responsive to the acknowledge signal to develop a second control signal, second circuit means coupling said receiving means to said timing means for applying said second control signal thereto to prevent said timing means from generating said first control signal so that transmission of said message ceases.

3. A supervisory control system having a plurality of remote stations each having message generating means and being adapted to transmit messages randomly to a central station via a communication channel, said control system including in combination, first transmitting means and first receiving means positioned at the central station, second transmitting means and second receiving means positioned at each remote station, first circuit means at each remote station coupling the message generating means to said second transmitting means for causing the generated messages to be transmitted to the central station, first and second timing means at each remote station coupled to said second transmitting means and said first circuit means thereat, each of said timing means being responsive to said message transmission by said second transmitting means to be actuated thereby for first and second predetermined time periods respectively, said first timing means acting to generate a first control signal at the end of said first time period, said first circuit means being responsive to said first control signal to cause said second transmission means to retransmit the message, said first timing means at each remote station having a different first predetermined time period than said first timing means at the other remote station, whereby said retransmission occurs at different times for each of the remote stations, said first receiving means being responsive to the transmitted message to develop a verification signal upon receipt of a correct transmitted message from a remote station, means coupling said first receiving means to said first transmitting means and being responsive to said verification signal to cause said first transmitting means to transmit an acknowledge signal, said second receiver means being responsive to said acknowledge signal received during said second predetermined time period to develop a second control signal, second circuit means at each remote station coupling said second receiving means to said first timing means thereat for applying said second control signal thereto and operating to prevent said timing means from generating said first control signal so that transmission of said message ceases.

4. A supervisory control system having a plurality of remote stations each having message generating means and being adapted to transmit messages randomly to a central station via a communication channel, said control system including in combination, first transmitting means and first receiving means positioned at the central station, second transmitting means and second receiving means positioned at each remote station, first circuit means at each remote station coupling the message generating means to said second transmitting means for causing the generated messages to be transmitted to the central station, timing means at each remote station coupled to said second transmitting means and said first circuit means thereat, each of said timing means being responsive to said message transmission by said second transmitting means to be actuated thereby for a predetermined time period and to generate a first control signal at the end of said time period, said first circuit means being responsive to said first control signal to cause said second transmission means to retransmit the message, said timing means at each remote station having a different time period than said timing means at the other remote stations, whereby said retransmission occurs at different times for each of the remote stations, said first receiving means being responsive to the transmitted message to develop a verification signal upon the receipt of a correct transmitted message from a remote station, means coupling said first receiving means to said first transmitting means and being responsive to said verification signal to cause said first transmitting means to transmit an acknowledge signal, said second receiver means being responsive to said acknowledge signal to develop a second control signal, second circuit means at each remote station coupling said second receiving means to said timing means thereat for applying said second control signal thereto and operating to prevent said timing means from generating said first control signal so that transmission of said message ceases, counter means at each remote station coupled to said timing means and responsive to a predetermined number of said first control signals to generate a third control signal, means coupling said third control signal to said timing means and operating to prevent said timing means from generating said first control signal after a predetermined number of retransmissions.

5. A supervisory control system having a plurality of remote stations each having message generating means and being adapted to transmit messages randomly to a central station via a communication channel, said control system including in combination, first transmitting means and first receiving means positioned at the central station, second transmitting means and second receiving means positioned at each remote station, first circuit means at each remote station coupling the message generating means to said second transmitting means for causing the generated messages to be transmitted to the central station, timing means at each remote station coupled to said second transmitting means and said first circuit means thereat, each of said timing means being responsive to said message transmission by said second transmitting means to be actuated thereby for a predetermined time period and to generate a first control signal at the end of said time period, said first circuit means being responsive to said first control signal to cause said second transmission means to retransmit the message, said timing means at each remote station having a different time period than said timing means at the other remote stations, whereby said retransmission occurs at different times for each of the remote stations, said first receiving means being responsive to the transmitted message to develop a verification signal upon the receipt of a correct transmitted message from a remote station, means coupling said first receiving means to said first transmitting means and being responsive to said verification signal to cause said first transmitting means to transmit an acknowledge signal, said second receiver means including counter means responsive to a predetermined number of said acknowledge signals to develop a second control signal, second circuit means at each remote station coupling said counter means to said timing means thereat for applying said second control signal thereto and operating to prevent said timing means from generating said first control signal so that transmission of said message ceases.

References Cited
UNITED STATES PATENTS 3,244,805 4/1966 Evans _____ 340—163 XR
3,252,138 5/1966 Young _____ 340—151 XR JOHN W. CALDWELL, Primary Examiner.

DONALD J. YUSKO, Assistant Examiner.